Jan. 20, 1959     M. ROMERO     2,870,027
PROCESS FOR STABILIZING MILK AND SIMILAR PRODUCTS
Filed April 5, 1954
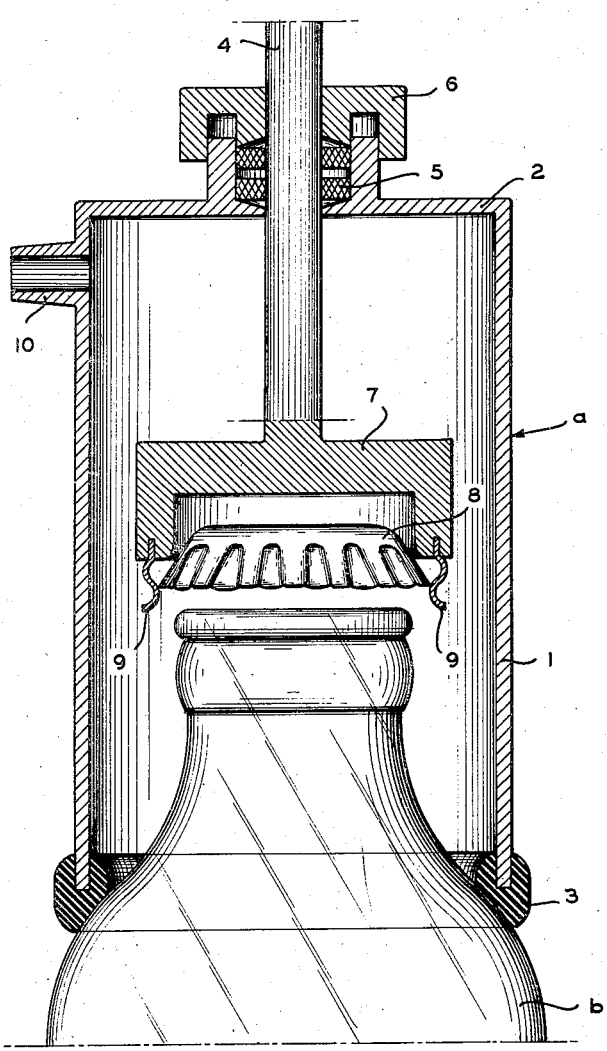
INVENTOR,
Manuel Romero
BY
ATTORNEY

United States Patent Office 2,870,027
Patented Jan. 20, 1959

2,870,027

PROCESS FOR STABILIZING MILK AND SIMILAR PRODUCTS

Manuel Romero, Montevideo, Uruguay, assignor to Stabil Internacional S. A., a corporation of Uruguay Application April 5, 1954, Serial No. 421,048

10 Claims. (Cl. 99—212)

This invention has to do with a process for stabilizing milk and some products derived from it, with a device adequate for carrying out one of the stages in the process, and with an installation that includes said device. The process is completed by physical means, without the addition of any preservative agent.

The term "stabilizing," as used here, is intended to signify that the milk treated may be kept in good condition through a long period of time, without any resultant change in its organoleptic characteristics, and without loss of nutritive value, as is also the case with the derivative products included.

Milk in its natural state is normally contaminated with micro-organisms whose action provokes increased acidity, which finally causes the milk to turn sour, and thus leaves it unfit for normal consumption.

Pasteurization, universally known and widely adopted, successfully destroys the vegetative forms of the germs existing in the milk, but has no effect on the spores, which on developing, reproduce the original microbeflora. Although it is true that by this method, or process, of pasteurization are destroyed certain pathogenic germs that make the milk dangerous to consume, such treatment does not hinder its acidification and consequent unfitness for normal consumption.

To avoid the loss of large quantities of milk, especially during the summer months, sterilization at high temperatures has been tried, but this method has the drawback of leaving the milk with a disagreeable "burnt taste," because the use of high temperature heating burns the lactose, while at the same time it leaves the milk with a darkened colour. As a result consumers have rejected the so-called sterilized milk.

However, when the sterilizing operation is preceded by a process of ebullition at lower temperatures and under a reduced pressure, the milk does not take on a burnt taste, nor does it darken in colour after the treatment; and it can safely be kept, or stored, a long time without the need of refrigeration.

The operation ought essentially to be an economical one, so as to avoid increased consumer prices for such a popular and widely distributed food product; just as it ought also to be realizable without costly equipment, and without equipment of complicated manipulation, to the end of assuring a rapid and large scale production that will serve to avoid loss of the product while stored and awaiting treatment.

Furthermore, the operating method ought to be of such nature as will permit of the use of returnable containers, since the "throw away" container is quite expensive in relation to the price of the contents. Among the containers had in mind, the glass bottle should have preference, because there is consumer resistance to milk in metal containers, which is not the case where the product can be plainly seen in its customary form and aspects.

This invention assures the avoidance of all such difficulties and inconveniences as those indicated, and the solution arrived at is of such nature as to make it applicable with excellent results, not only to milk but also to some of its derivatives, such as cream, and also to such compound products as coffee and milk, or tea and milk, all of which are stabilized for a long time, thus making possible their storage and transport without the use or need of refrigeration, the while maintaining their nutritive qualities and their organoleptic characteristics.

The over-all process includes a method that is new and distinct, and a device that permits the completion of the fundamental stages of the operation.

An object of the invention is, then, a process for the stabilization of milk, lasting for a long time, without the necessity of refrigeration while maintaining all of its nutritive qualities and organoleptic characteristics.

Another object of the invention is a process for the stabilization of milk contained in containers of the type returnable for continued use, capable of resisting long storage at room temperature without loss of its nutritive qualities or alteration of its organoleptic characteristics.

Another object of the invention is a process for the stabilization of cream (milk cream), to maintain intact all of its characteristics over a long period of time, without necessity for refrigeration.

Still another object is a process for the stabilization of the combined preparation of coffee and milk, or of tea and milk, contained in returnable containers, to maintain their nutritive qualities and organoleptic characteristics, including the aroma characteristic of the products added to the milk.

Also an object of this invention is a device for the completion of one of the stages in the process of stabilizing the milk and its derivatives as mentioned.

A final object of this invention is an installation adequate for the purposes of the industrial production of stabilized milk, as also of some of its stabilized derivatives, contained in containers that are returnable for continued use, which installation includes, besides the means that are of common knowledge and use in the milk industries, a device capable of acting on the containers in such a way as to complete one of the stages in the process of stabilization of the contents.

Details of all of these objects are set forth below.

With respect to the general process, it must be noted that it includes, as a fundamental stage, ebullition of the liquids at low temperature and at diminished pressure, effected by subjecting them to the process after they have first been placed in their final containers, which are of the type returnable for continued use.

The procedure for completing the whole process is as follows:

Milk (or one of its derivative liquid products mentioned) while at a temperature inferior to that of its boiling point at normal pressure, is placed in a container of the type returnable for further use and in which the product is to be delivered to the ultimate consumer, and which is provided with a means for hermetically closing it; a vacuum is created in the interior of the container until the liquid enters the boiling stage; in which stage it is maintained for a few seconds; still within the vacuum, the container is hermetically closed, without permitting air to enter into it; and, finally, the container, hermetically closed, is subjected to the action of heat, at a temperature and for a length of time necessary to assure the sterilization of its contents.

An advantage of the process realized in the manner described is that the sterilizing operation is completed by action on the definite container of the product, thus making unnecessary a transfer of that product with the consequent risk of a new contamination.

The product thus obtained does not have a "cooked taste," since the initial ebullition is brought about at a low temperature; nor does it have a burnt taste, since the ebullition, or low temperature boiling process, forces out all of the gases which, if left dissolved in the milk, might act as oxidizing agents during the subsequent period of heating for sterilization purposes.

By virtue of all this, it is possible to put so sensitive a product as cream (milk cream) through this process, because, under the operating conditions thus obtained, it resists the high temperatures necessary to assure its sterilization without undergoing any alterations that can detract from its quality or change its characteristics. The same thing holds true in the case of such combinations as coffee and milk, or tea and milk, which preserve, in each case, their typical aromas.

The ebullition, or boiling operation, to which reference has been made, is possible at a very low temperature; for example, it is possible to operate with milk kept at a temperature of 5° C., and which may have been transferred directly from the storage tanks to the containers; at this temperature the milk will enter into ebullition when the degree of vacuum is such that the pressure in the interior of the container is brought to 5.5 millimeters (mercury guage).

However, it is not necessary to operate at such low temperatures, it being advisable to operate at temperatures ranging from 40° C. to 65° C. Operating within this range of temperature, ebullition of the milk is brought about at higher pressure points, which facilitates the operation. For example, operating with milk at 46° C. it enters into ebullition when the pressure in the interior of the container is brought to 76 millimeters (mercury guage).

Further details of the process are set forth in the examples that follow:

*First example.*—Cow's milk of 0.13 percent acidity was heated at a temperature of 46° C., and then placed in a glass bottle of a single liter capacity; a vacuum was created in the interior of the bottle and when the pressure was brought to 76 millimeters (mercury guage) the milk contained therein entered into ebullition and the boiling was continued for three seconds, at the end of which period the bottle was hermetically closed; immediately thereafter, the bottle was placed in the interior of an autoclave where it was heated at a temperature of 120° C. (2 atmospheres of pressure) for a period of six minutes; the bottle was then removed from the autoclave and allowed to cool gradually, without refrigeration.

After being kept for ten weeks at room temperature that averaged 25° C. the bottle was opened and an analysis was made of its contents.

The analysis showed the milk to be in an excellent state of preservation; it did not have a "burnt taste" and its organoleptic characteristics were those of the same milk in its raw state. Its acidity had diminished to 0.12 percent.

Bacteriological tests proved the milk to be sterile.

The same results were obtained with milk that had been homogenized before subjecting it to the low temperature heating which is the initial step in the process.

*Second example.*—Cream, of 0.12 percent acidity from cow's milk, was heated at 46° C., and then placed in a glass bottle with a capacity of one liter; a vacuum was created in the interior of the bottle until the ebullition of its contents was brought about, which occurred when the pressure was brought to 74 millimeters (mercury guage), and the ebullition was made to continue for three seconds, at the end of which period the bottle was hermetically closed immediately thereafter, the bottle was placed in the interior of an autoclave where it was heated at a temperature of 120° C. (2 atmospheres of pressure) for six minutes; the bottle was then removed from the autoclave and left to cool gradually.

When the cream of cow's milk is kept at a temperature of 46° C. it becomes markedly fluid, or thin, thus permitting its smooth or quiet ebullition, which facilitates, the execution of this step in the process.

After leaving the cream, treated as described above, in its glass bottle container exposed to room temperature through a period of ten weeks, it was subjected to analysis and proved to be in an excellent state of preservation.

In industrial operation, it will be of advantage to treat cream in larger containers, with a view to its eventual use in the production of fresh butter.

As this cream is sterile, there is no need of its pasteurization preparatory to the infusion of fermenting agents for the production of butter; the ripening of the cream is brought about under very favorable conditions, since germs disturbing to the process are not present. The butter made from this cream is of agreeable taste and smell.

*Third example.*—Coffee and milk as a combined product (7 parts milk and 3 parts strong preparation of black coffee), as also tea and milk, (2 parts milk and 8 parts strong preparation of tea), when treated in the manner indicated in the first example above, remained perfectly stabilized after ten weeks of exposure, in their containers, to room temperature. When at the termination of such period, the bottles were opened, the aromas characteristic of the coffee and the tea, respectively, were clearly perceptible and discernible; the state of preservation of the products was excellent.

The means that makes possible the execution at low temperature of the ebullition stage of the process, with the liquids already placed in their definitive containers, is the device illustrated in cross section, in the attached sketch.

The device under reference is comprised of a hood *a* that can be placed over and above the mouth of the bottle *b* and adjusted to the outer surface of the neck; this hood is constituted by a cylindrical tube 1 the upper end of which is closed by a lid 2, while the lower end is open, and edged by an encircling elastic band 3 above, the lid 2 is provided with a perforation through which a round rod 4 can slide, axle-wise in relation to the tube 1 with a view to assuring the hermetic closing the free space, or play, around this rod 4, packing 5 is provided and can be compressed by a packing-press 6; at the inside end of the rod 4 is attached a mandrel 7 for the purpose of carrying out the action of closing the bottle *b* with the crown-top 8 that is held by the mandrel through the action of spring-clamps 9; while at rest, in its inactive position, the mandrel is so disposed that the crown-top is held in alignment with the mouth of the bottle, but in an elevated position so as not to hinder the extraction of the air from the interior of the bottle.

The tube 1 is provided with a lateral opening or exit 10, through which is to be established the connection with a suction apparatus for creating the vacuum.

In the execution of the process, as determined by this invention, the device just described is employed in this manner: once the bottle *b* is filled with the liquid maintained at the desired temperature, it is placed in axle alignment with the hood *a* which is lowered until the elastic band 3 operates to close it hermetically by pressure on the outer surface of the bottle at the widening part of its neck; a vacuum is created by extracting the air through the exit 10, and this action is continued until the pressure in the interior of the bottle is equal to the saturated vapour tension of its liquid contents at their temperature of the moment; on arriving at this point of pressure, the liquid contents of the bottle will enter into the state of ebullition; the rod 4 goes into action, sliding downward until forcing the crown-top 8 to close hermetically the mouth of the bottle, the vacuum in the interior of the hood *a* is annulled and the bottle, having been hermetically closed within the vacuum, is removed and put through the sterilizing operation. The total amount of time required for the operation that involves boiling the liquid, and closing and removing the bottle, is approximately ten seconds.

The energetic movement of the liquid, produced by its ebullition, furthers the complete elimination of the oxidizing gases present in the milk, which otherwise would remain to be the cause of the burning of the lactose during the subsequent operation of sterilization.

It is to be understood that, in practice the device described above will be suitably supported and provided with all needed means for executing the various actions and movements necessary for completing the operation for the purpose for which it has been created.

These means are not here illustrated, since they have to do with commonly known mechanical arrangements that present no difficulties.

For the industrial exploitation of the process comprised in this invention it will be necessary to install equipments that include several of the devices, such as that herein described so that it will be possible to operate with several bottles at a time.

These equipments ought to form a part of an installation, in each case, of the type in general that are used in the milk industry, and such installation ought to include common storage tanks, pumps for circulating the liquids, and equipments for heating at controlled temperatures; all of these means will be aptly complemented by the device that is herein described in detail and which is adequate for the purposes of carrying out the fundamental stage of the process. Such installation ought also to include a means for heating the containers to the point of assuring the sterilization of their contents, but no special means for fulfilling this purpose is here illustrated or described, inasmuch as it may well be any one of those known to the industry.

It should be explained that any of the known bottle caps capable of effecting the hermetic closing of the container can be substituted for the crown-top mentioned in the description of the device; in such case, the closing mandrel would have to be adapted to the cap selected.

Also, for practical purposes, metal containers of greater volume can be used for the milk products intended for large consumers, such as hospitals, restaurants, etc., in which case the device for carrying out the actions, within a vacuum, of ebullition and of closing the bottle must be of dimensions and form adequate for the size of the containers under operation.

I claim:

1. A process for the stabilization of a liquid selected from the group consisting of milk, cream, a liquid cream product and a liquid milk product comprising heating said liquid to a temperature below its boiling point at normal pressure, placing said heated liquid in its final container, exposing said liquid to a vacuum to remove the gases therein until ebullition occurs and maintaining said vacuum until the gases present in said liquid are substantially completely removed, hermetically closing said container under said vacuum conditions and heating the container and its contents to a sufficient temperature for a sufficient time to assure sterilization of said contents.

2. A process for the stabilization of a liquid selected from the group consisting of milk, cream, a liquid cream product and a liquid milk product comprising providing a container of said liquid, exposing said liquid to a vacuum to remove the gases therein until ebullition occurs and maintaining said vacuum until the gases absorbed therein are substantially completely removed, hermetically closing said container under said vacuum conditions and heating the container and its contents to a sufficient temperature for a sufficient time to assure sterilization of said contents.

3. A process for the stabilization of a liquid selected from the group consisting of milk, cream, a liquid cream product and a liquid milk product comprising providing a container of said liquid, exposing said liquid to a vacuum to remove the gases therein until ebullition occurs and maintaining said vacuum until the gases absorbed therein are substantially completely removed, and hermetically closing said container under said vacuum conditions.

4. A process for the stabilization of a liquid selected from the group consisting of milk, cream, a liquid cream product and a liquid milk product as recited in claim 1 in which said temperature below the boiling point at normal pressure is between 40 and 65° C. and said sterilizing temperature is above the boiling point at normal pressure.

5. A process for the stabilization of a liquid selected from the group consisting of milk, cream, a liquid cream product and a liquid milk product as recited in claim 4 in which said sterilizing temperature is approximately 130° C.

6. A process for the stabilization of a liquid selected from the group consisting of milk, cream, a liquid cream product and a liquid milk product as recited in claim 5 in which said temperature below the boiling point at normal pressure is about 50° C.

7. A process for the stabilization of a liquid selected from the group consisting of milk, cream, a liquid cream product and a liquid milk product as recited in claim 1 in which said container is a glass bottle.

8. A process for the stabilization of a liquid as recited in claim 2 in which the liquid is, prior to its introduction into the container, preheated to a temperature under the boiling point at normal pressure.

9. A process for the stabilization of a liquid as recited in claim 2 in which the liquid is, prior to its introduction into the container, preheated at normal pressure to a temperature between about 40° C. and about 65° C.

10. A process for the stabilization of a liquid selected from the group consisting of milk, cream, a liquid cream product and a liquid milk product as recited in claim 2 in which the sterilizing temperature is approximately 130° C.

References Cited in the file of this patent

UNITED STATES PATENTS

| | | |
|---|---|---|
| 347,095 | Doherty | Aug. 10, 1886 |
| 725,967 | Howe | Apr. 21, 1903 |
| 602,315 | Fernandez | Apr. 12, 1912 |
| 1,294,820 | Middleton | Feb. 18, 1919 |
| 1,386,887 | Malmquist | Aug. 9, 1921 |
| 2,428,044 | Sharp et al. | Sept. 30, 1947 |
| 2,772,979 | Graves | Dec. 4, 1956 |

OTHER REFERENCES

Serial No. 296,136, Shirokisawa (A. P. C.), published May 4, 1943.